United States Patent
Kwon et al.

(10) Patent No.: US 10,719,411 B1
(45) Date of Patent: Jul. 21, 2020

(54) ERROR RECOVERY OF ENCRYPTED DATA FRAMES IN MULTI-NODE SYSTEMS

(71) Applicant: Rockwell Collins, Inc., Cedar Rapids, IA (US)

(72) Inventors: TJ T. Kwon, Marion, IA (US); Robert W. Hartney, Cedar Rapids, IA (US); Dayton G. Smith, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/371,370

(22) Filed: Apr. 1, 2019

(51) Int. Cl.
*G06F 11/14* (2006.01)
*H04W 12/00* (2009.01)
*H04W 84/18* (2009.01)

(52) U.S. Cl.
CPC ....... *G06F 11/1464* (2013.01); *H04W 12/001* (2019.01); *G06F 2201/82* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 6,021,197 A | * | 2/2000 | von Willich | ....... H04N 21/4627 380/212 |
| 7,680,946 B2 | * | 3/2010 | Yamada | ............ H04L 29/06027 370/392 |

* cited by examiner

*Primary Examiner* — Phung M Chung
(74) *Attorney, Agent, or Firm* — Suiter Swantz pc llo

(57) ABSTRACT

A method of performing error recovery of encrypted data frames is disclosed. A data packet is received, and a decryption operation is performed on the data packet. The data packet is compared with one or more data packets stored in a recovery buffer to identify a duplicate of the data packet when the decryption operation fails. One or more bits affected by one or more bit errors are identified based on a comparison between the data packet and the duplicate of the data packet. Different combinations of bit values for the one or more bits are determined. The decryption operation is performed on the data packet with the different combinations to identify a correct combination of bit values for the one or more bits. The data packet is recovered (e.g., corrected so that it can be decrypted and consumed) based on the correct combination of bit values.

20 Claims, 7 Drawing Sheets

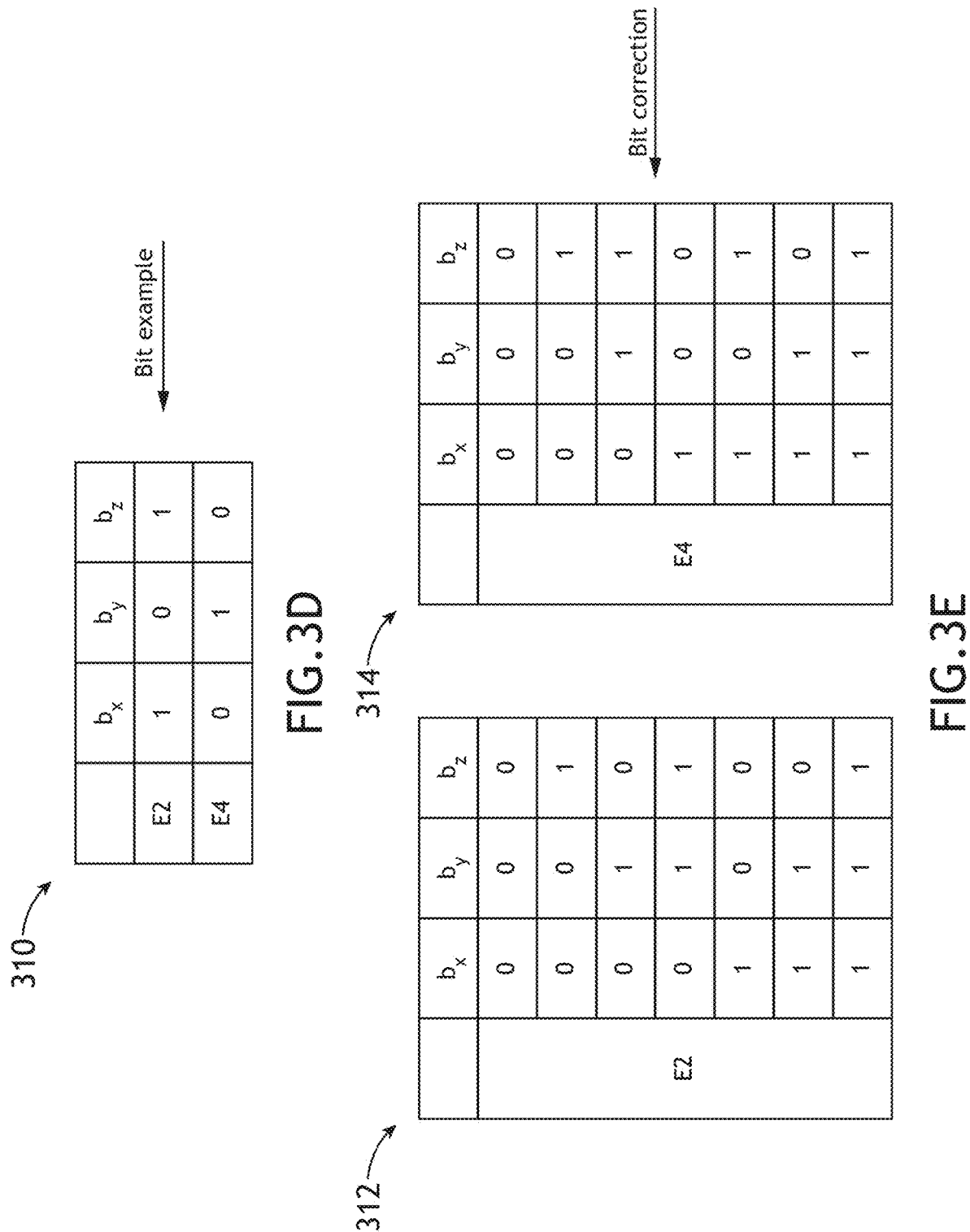

ERROR RECOVERY OF ENCRYPTED DATA FRAMES IN MULTI-NODE SYSTEMS

BACKGROUND

Communication nodes in a multi-node system, such as a mobile ad hoc network (MANET), often receive duplicates of a data packet. However, the received packets may be discarded by a communication node if there are one or more bit errors in the data packets. This can result in communication failures and/or may require additional broadcast attempts, thereby degrading system performance. Furthermore, in current systems, without adding additional error-correcting code (ECC) to the data packets, encrypted data packets cannot be decrypted when they include one or more bit errors.

SUMMARY

A communication node for performing error recovery of encrypted data frames based on duplicate data packets is disclosed. In one or more embodiments, the communication node includes a communication interface and a controller communicatively coupled to the communication interface. The controller is configured to receive a data packet via the communication interface. The controller is further configured to perform a decryption operation on the data packet. The controller is further configured to compare the data packet with one or more data packets stored in a recovery buffer to identify a duplicate of the data packet when the decryption operation fails. The controller is further configured to identify one or more bits affected by one or more bit errors based on a comparison between the data packet and the duplicate of the data packet. The controller is further configured to determine different combinations of bit values for the one or more bits. The controller is further configured to perform the decryption operation on the data packet with the different combinations of bit values for the one or more bits to identify a correct combination of bit values for the one or more bits. The controller is further configured to recover the data packet (e.g., correct the data packet so that it can be decrypted and consumed) based on the correct combination of bit values for the one or more bits.

In some embodiments of the communication node, the controller is further configured to remove the duplicate of the data packet from the recovery buffer after recovering the data packet.

In some embodiments of the communication node, the controller is further configured to tag the data packet with a time stamp and store the data packet in the recovery buffer when there are no duplicates of the data packet in the recovery buffer.

In some embodiments of the communication node, the controller is further configured to remove the data packet from the recovery buffer after a predetermined amount of time has lapsed from the time stamp.

In some embodiments of the communication node, the controller is further configured to remove an oldest data packet from the recovery buffer upon receipt of a new data packet when the recovery buffer is full, wherein the recovery buffer is configured to store up to a predetermined maximum number of data packets.

In some embodiments of the communication node, the controller is configured to identify the duplicate of the data packet when the data packet and the duplicate of the data packet have less than a predetermined maximum number of mismatched bit values.

In some embodiments of the communication node, the controller is configured to receive the data packet from another communication node within a multi-node system.

A multi-node system for performing error recovery of encrypted data frames based on duplicate data packets is also disclosed. In one or more embodiments, the multi-node system includes a plurality of communication nodes configured to receive data packets broadcasted from other communication nodes within the multi-node system. In one or more embodiments, a communication node of the plurality of communication nodes includes a communication interface and a controller communicatively coupled to the communication interface. The controller is configured to receive a data packet from another communication node via the communication interface. The controller is further configured to perform a decryption operation on the data packet. The controller is further configured to compare the data packet with one or more data packets stored in a recovery buffer to identify a duplicate of the data packet when the decryption operation fails. The controller is further configured to identify one or more bits affected by one or more bit errors based on a comparison between the data packet and the duplicate of the data packet. The controller is further configured to determine different combinations of bit values for the one or more bits. The controller is further configured to perform the decryption operation on the data packet with the different combinations of bit values for the one or more bits to identify a correct combination of bit values for the one or more bits. The controller is further configured to recover the data packet (e.g., correct the data packet so that it can be decrypted and consumed) based on the correct combination of bit values for the one or more bits.

In some embodiments of the multi-node system, the controller is further configured to remove the duplicate of the data packet from the recovery buffer after recovering the data packet.

In some embodiments of the multi-node system, the controller is further configured to tag the data packet with a time stamp and store the data packet in the recovery buffer when there are no duplicates of the data packet in the recovery buffer.

In some embodiments of the multi-node system, the controller is further configured to remove the data packet from the recovery buffer after a predetermined amount of time has lapsed from the time stamp.

In some embodiments of the multi-node system, the controller is further configured to remove an oldest data packet from the recovery buffer upon receipt of a new data packet when the recovery buffer is full, wherein the recovery buffer is configured to store up to a predetermined maximum number of data packets.

In some embodiments of the multi-node system, the controller is configured to identify the duplicate of the data packet when the data packet and the duplicate of the data packet have less than a predetermined maximum number of mismatched bit values.

In some embodiments of the multi-node system, the multi-node system is a mobile ad hoc network (MANET), and the communication node is a mobile communication node.

A method of performing error recovery of encrypted data frames is also disclosed. In one or more embodiments, the method includes the following steps. A data packet is received. A decryption operation is performed on the data packet. The data packet is compared with one or more data packets stored in a recovery buffer to identify a duplicate of the data packet when the decryption operation fails. One or more bits affected by one or more bit errors are identified based on a comparison between the data packet and the duplicate of the data packet. Different combinations of bit values for the one or more bits are determined. The decryption operation is performed on the data packet with the different combinations to identify a correct combination of bit values for the one or more bits. The data packet is recovered (e.g., corrected so that it can be decrypted and consumed) based on the correct combination of bit values for the one or more bits.

In some embodiments of the method, the duplicate of the data packet is removed from the recovery buffer after recovering the data packet.

In some embodiments of the method, the data packet is tagged with a time stamp and stored in the recovery buffer when there are no duplicates of the data packet in the recovery buffer.

In some embodiments of the method, the data packet is removed from the recovery buffer after a predetermined amount of time has lapsed from the time stamp.

In some embodiments of the method, an oldest data packet is removed from the recovery buffer upon receipt of a new data packet when the recovery buffer is full, wherein the recovery buffer is configured to store up to a predetermined maximum number of data packets.

In some embodiments of the method, the duplicate of the data packet is identified when the data packet and the duplicate of the data packet have less than a predetermined maximum number of mismatched bit values.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3D shows a table illustrating different values at mismatched bits of the duplicate data frames (e.g., the received data frame and previously stored data frame of FIG. 3C), in accordance with one or more embodiments of this disclosure;

FIG. 3E shows tables illustrating possible combinations of correct values for the mismatched bits of the duplicate data frames (e.g., the received data frame and previously stored data frame of FIG. 3C), in accordance with one or more embodiments of this disclosure.

DETAILED DESCRIPTION

Figure 1:
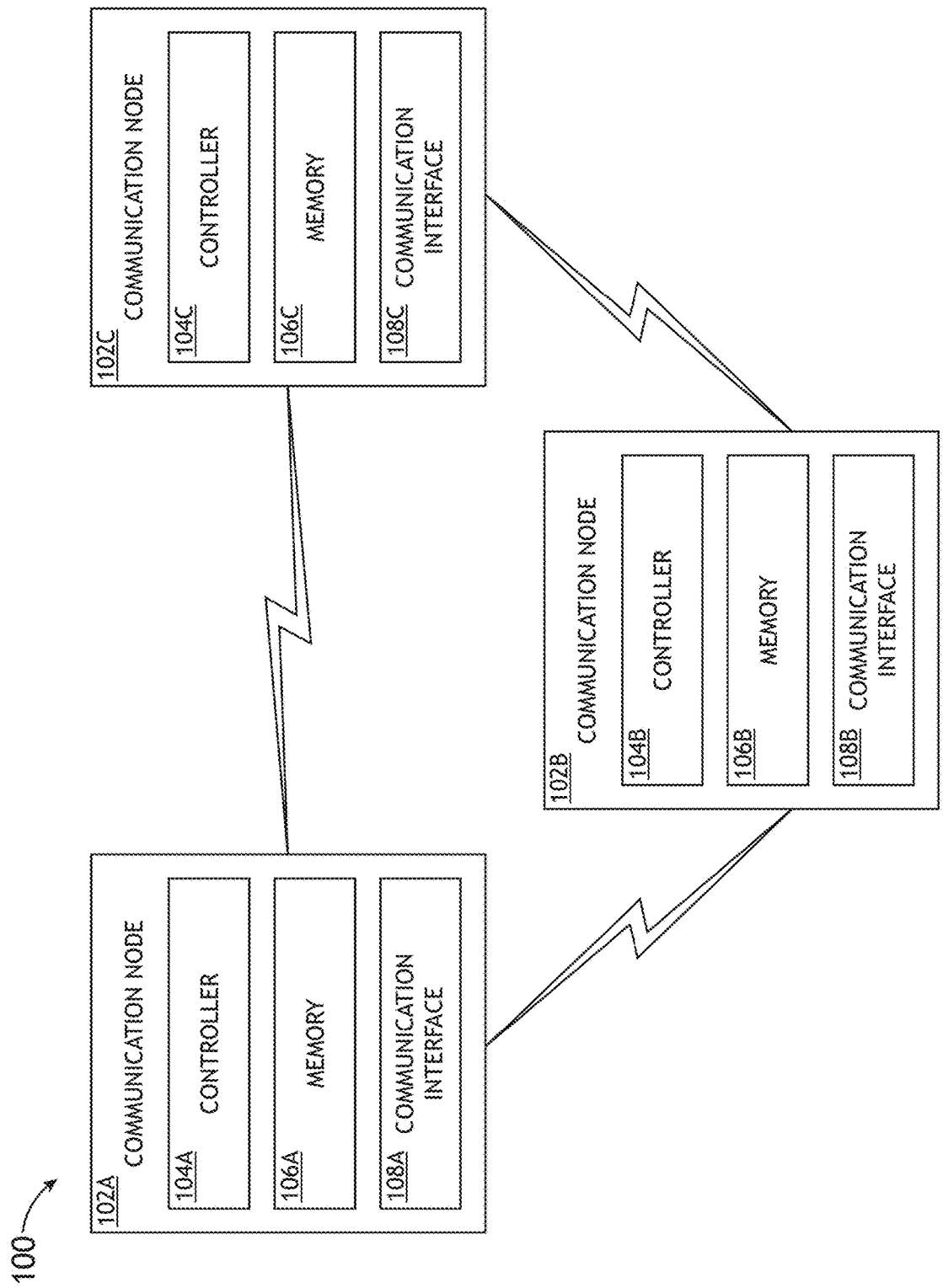
FIG. 1 is a block diagram illustrating a multi-node system that employs error recovery of encrypted data frames, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Techniques for performing error recovery of encrypted data frames based on duplicate data packets are disclosed. Communication nodes in a multi-node system, such as a mobile ad hoc network (MANET), often receive duplicates of a data packet. However, the received packets may be discarded by a communication node if there are one or more bit errors in the data packets. This results in communication failures and/or requires additional broadcast attempts, thereby degrading system performance. Furthermore, in current systems, without adding additional error-correcting code (ECC) to the data packets, encrypted data packets cannot be decrypted when they include one or more bit errors. The disclosed encrypted data frame error recovery techniques enable recovery of bit errors by utilizing duplicates of data packets that otherwise would have been thrown away. As the result, multi-node systems (e.g., MANETs) may operate with improved performance (e.g., because of higher recovery rate) and lower overhead (e.g., by not having to resend as many data packets). Furthermore, the disclosed data frame error recovery techniques enable recovery of bit errors without having to increase the length of data packets to include error recovery information (e.g., ECC, hamming codes, etc.) in the data packets themselves.

FIG. 1 illustrates a multi-node system 100, in accordance with an example embodiment of the present disclosure. In embodiments, the multi-node system 100 may include a plurality of communication nodes 102. For example, the multi-node system 100 may include a first communication node 102A, a second communication node 102B, a third communication node 102C, and so on.

The multi-node system 100 may comprise any multi-node communication network known in the art. For example, in some embodiments, the multi-node system 100 may be a mobile ad-hoc network (MANET) in which one or more of the communication nodes 102 within the multi-node system 100 are mobile communication nodes that are able to move freely and independently. Similarly, the one or more communication nodes 102 may include any communication node known in the art which may be communicatively coupled. In this regard, the one or more communication nodes 102 may include any communication node known in the art for transmitting and receiving data packets. For example, the one or more communication nodes 102 may include, but are not limited to, radios, mobile phones, smart phones, tablets, smart watches, laptops, computer systems, or any combination thereof.

In embodiments, each communication node 102 (e.g., communication node 102A, 102B, 102C, etc.) includes a respective controller 104 (e.g., controller 104A, 104B, 104C, etc.), memory 106 (e.g., memory 106A, 106B, 106C, etc.), and communication interface 108 (e.g., communication interface 108A, 108B, 108C, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices.

In embodiments, the communication interface 108 includes or is coupled to a transmitter, receiver, transceiver, physical connection interface, or any combination thereof. In some embodiments, the communication interface 108 of a communication node 102 may be configured to communicatively couple to additional communication interfaces 108 of additional communication nodes 102 of the multi-node system 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

Figure 2:
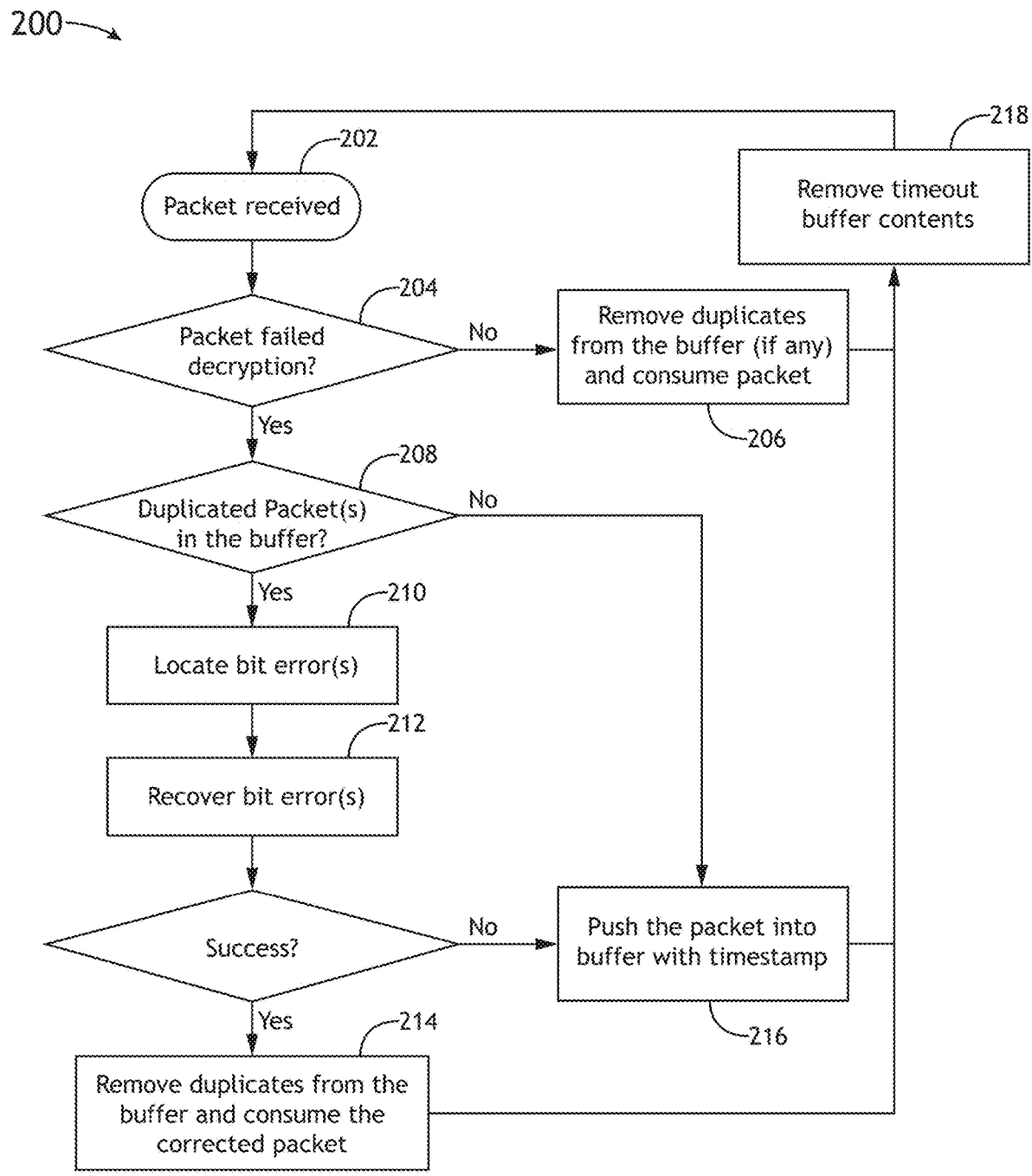
FIG. 2 is a flow diagram illustrating a method of performing error recovery of encrypted data frames within a multi-node system, such as the multi-node system illustrated in FIG. 1, in accordance with one or more embodiments of this disclosure.

FIG. 2 illustrates a method 200 of performing error recovery of encrypted data frames based on duplicate data packets. The method 200 may be carried out by the multi-node system 100. In this regard, the multi-node system 100 may include any component/configuration required to carry out a step/function of the method 200; similarly, the method 200 may include any step/function that corresponds to a component/configuration of the multi-node system 100. For example, the controller 104 of a communication node 102 may be configured to carry out various steps and functions of the method 200 illustrated in FIG. 2.

At step 202, a data packet (i.e., a fully or partially encrypted data packet) is received by a communication node 102. In embodiments, the controller 104 is configured to receive the data packet via the communication interface 108. For example, the data packet may be broadcast or sent directly to the communication node 102/controller 104 from another communication node 102 within the multi-node system 100.

At step 204, a decryption operation is performed on the data packet. In embodiments, the controller 104 is configured to perform a decryption operation on the data packet to decrypt (e.g., decode and/or extract) information from one or more encrypted data frames of the data packet.

If the data packet is successfully decrypted, the data packet is consumed (e.g., accepted/read by the controller 104) and any duplicates of the data packet may be removed (e.g., deleted) from a recovery buffer (step 206). In embodiments, the controller 104 is configured to consume the data packet and remove any duplicates of the data packet from the recovery buffer when the data packet is successfully decrypted (meaning that the data packet is not corrupted by any bit errors).

Figure 3A:
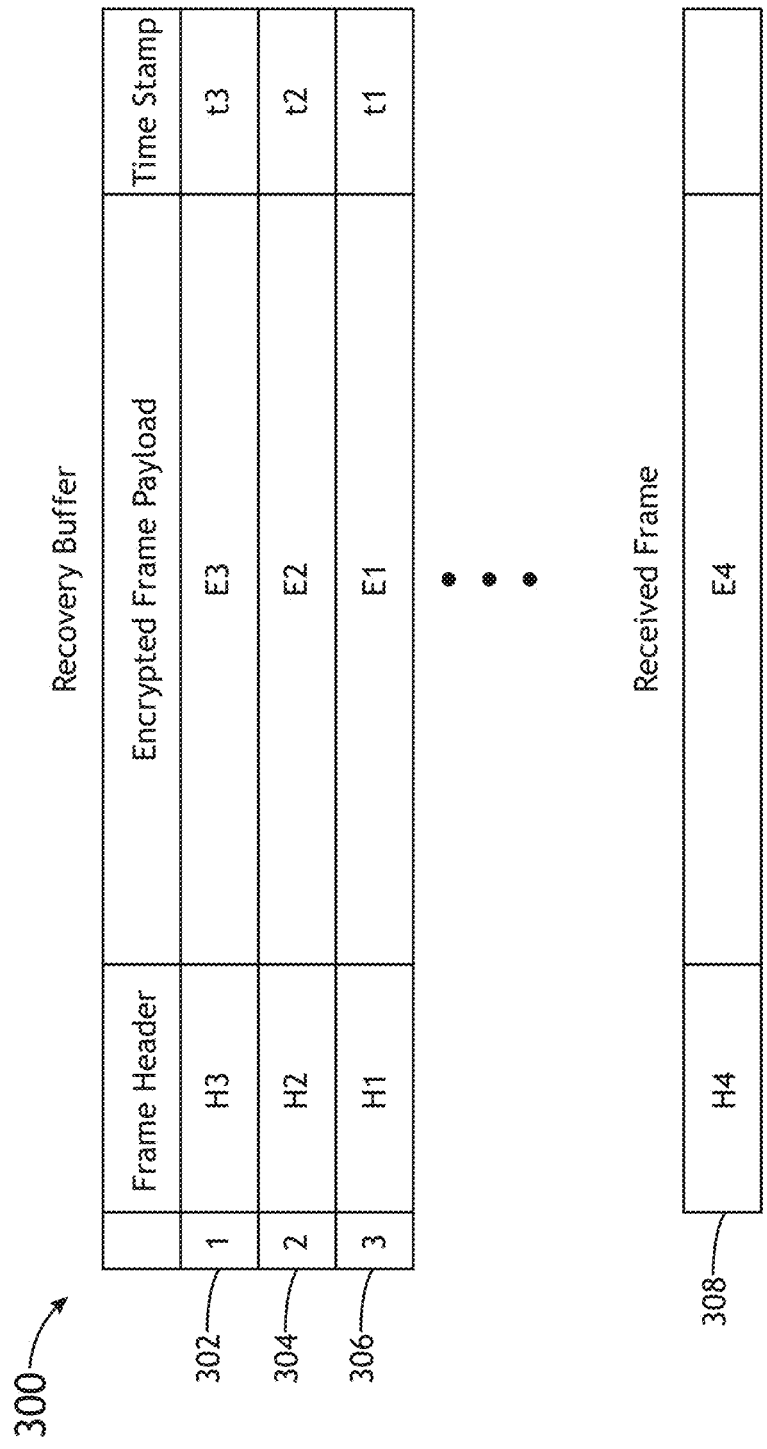
FIG. 3A schematically illustrates a newly received data frame and a recovery buffer with one or more previously stored data frames, in accordance with one or more embodiments of this disclosure.

The recovery buffer may be stored in memory 106 of the communication node 102/controller 104. FIG. 3A illustrates an example of a recovery buffer 300 with a plurality of data packets (e.g., data packets 302, 304, 306, etc.) stored therein. When the received data packet (e.g., data packet 308) can be successfully decrypted (i.e., the data packet is not corrupted by any bit errors), any duplicates of the data packet 308 that are in the recovery buffer 300 can be deleted because they are no longer needed. In some embodiments, a duplicate of the data packet is identified when the data packet and the duplicate of the data packet have less than a predetermined maximum number of mismatched bit values. For example, the controller can be configured to identify the duplicate of the data packet when the data packet and the duplicate of the data packet have less than a predetermined maximum number of mismatched bit values. In an example shown in FIG. 3B, data packet 302 and data packet 308 are not duplicates because they have more mismatched bit values than the predetermined maximum number (e.g., 5, 10, 100, or any number selected or calculated based on system requirements). In another example shown in FIG. 3C, data packet 304 and data packet 308 are duplicates because they have less mismatched bit values than the predetermined maximum number. In this case, if data packet 308 is decrypted and consumed, the controller 104 may be configured to delete data packet 304 from the recovery buffer 300 because it is no longer needed for bit error recovery.

Figure 3B:
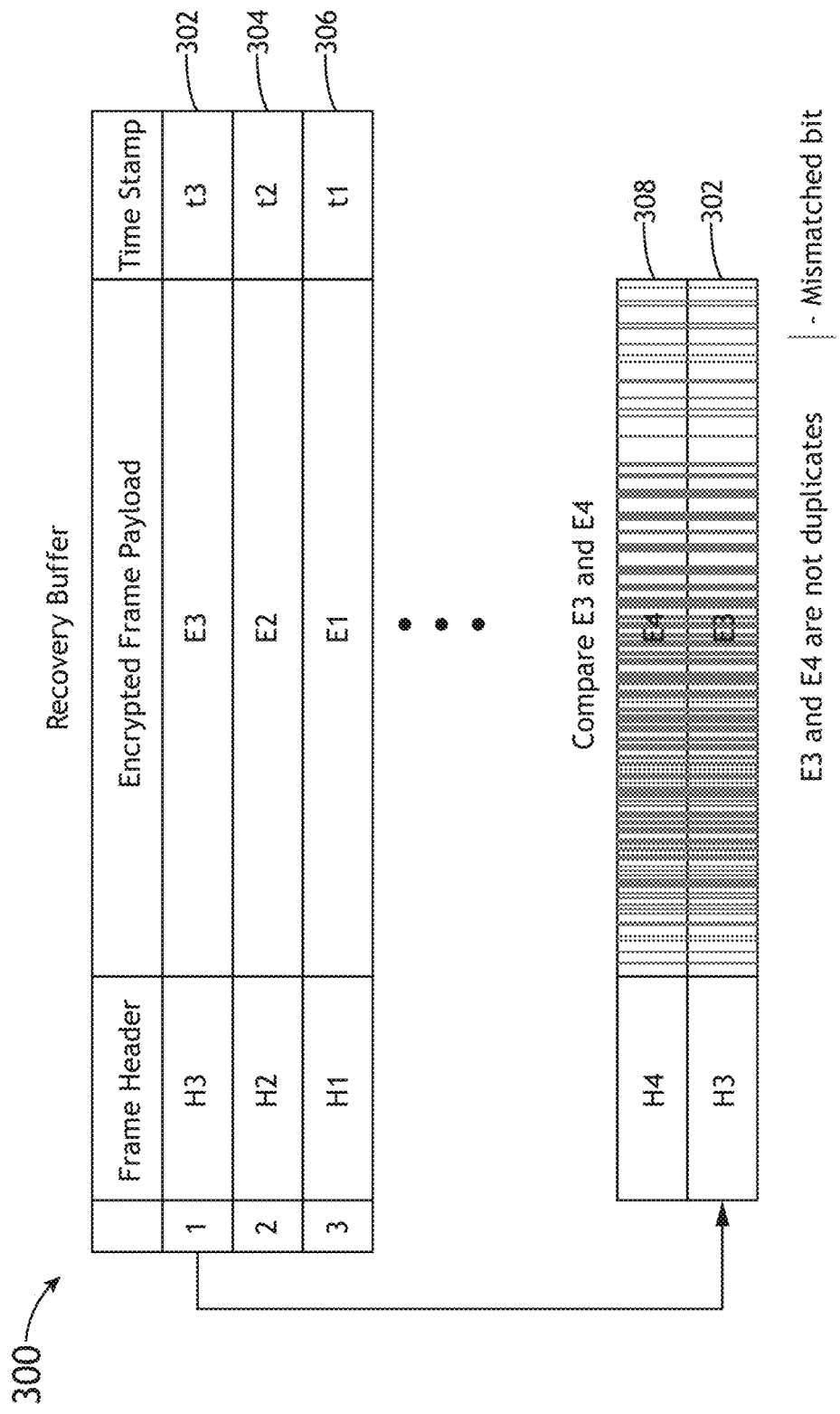
FIG. 3B schematically illustrates a step of comparing the received data frame with a previously stored data frame in the recovery buffer, wherein the received data frame and the previously stored data frame are not duplicates, in accordance with one or more embodiments of this disclosure.
Figure 3C:
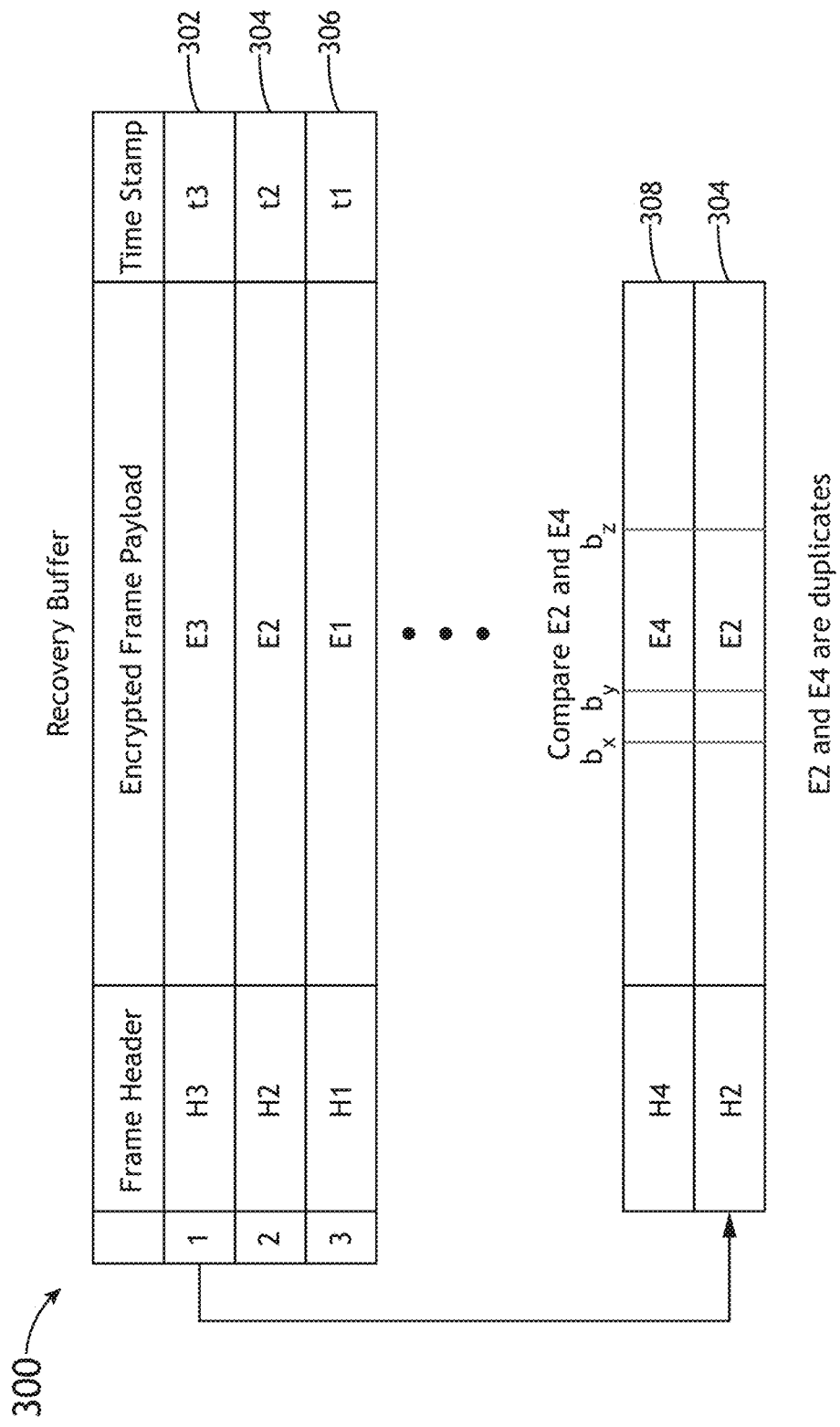
FIG. 3C schematically illustrates a step of comparing the received data frame with a previously stored data frame in the recovery buffer, wherein the received data frame and the previously stored data frame are duplicates, in accordance with one or more embodiments of this disclosure.

If the decryption operation fails, the data packet may be corrupted by one or more bit errors. Accordingly, when the decryption operation fails, the data packet is compared with one or more previously stored data packets in the recovery buffer to identify a duplicate of the data packet that can be used for bit error recovery (step 208). In embodiments, the controller 104 is configured to compare the data packet with one or more data packets stored in the recovery buffer to identify a duplicate of the data packet when the decryption operation fails (e.g., when the data packet is corrupted such that it cannot be decrypted). An example of a bitwise comparison between data payloads E3 and E4 of data packet 302 and data packet 308 is illustrated in FIG. 3B. In the example shown in FIG. 3B, data packet 302 and data packet 308 are not duplicates because they have more mismatched bit values than the predetermined maximum number. An example of a bitwise comparison between data payloads E2 and E4 of data packet 304 and data packet 308 is illustrated in FIG. 3C. In the example shown in FIG. 3C, data packet 304 and data packet 308 are duplicates because they have less mismatched bit values than the predetermined maximum number. In this case, the controller 104, based on the bitwise comparison, the controller 104 is configured to identify data packet 304 as a duplicate of data packet 308. In some embodiments, the recovery buffer 300 may include multiple duplicates. The controller 104 may be configured to perform bit error recovery utilizing the duplicate that has the least number of mismatched bits relative to the received data packet. In other embodiments, the controller 104 may be configured to perform bit error recovery utilizing the first identified duplicate.

At step 210, one or more bits (or bit locations) affected by one or more bit errors are identified based on a comparison between the data packet and the duplicate of the data packet. In embodiments, the controller 104 is configured to identify one or more bits affected by the one or more bit errors based on a comparison between the data packet and the duplicate of the data packet. For example, as shown in FIG. 3C, the controller 104 may be configured to identify the mismatched bits bx, by, and bz as the bits affected by the one or more bit errors in data packet 308.

Figure 3F:
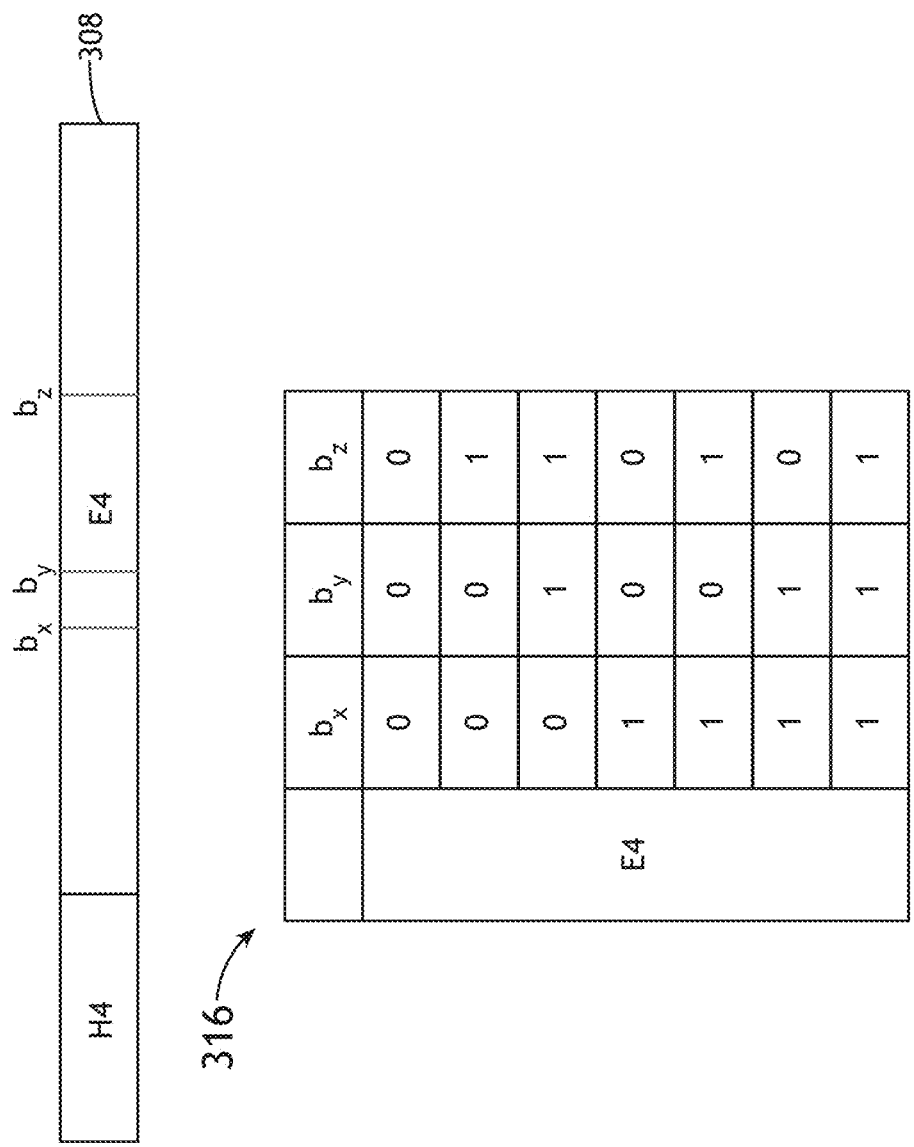
FIG. 3F shows a table illustrating possible combinations of correct values for the mismatched bits of the received data frame based on removing the original values of the mismatched bits of the received data frame and the previously stored data frame from the tables in FIG. 3E, in accordance with one or more embodiments of this disclosure.

At step 212, different combinations of bit values for the one or more bits (e.g., bits bx, by, and bz) are determined, and the decryption operation is performed on the data packet (e.g., data packet 308) with the different combinations to identify a correct combination of bit values for the one or more bits. In embodiments, the controller 104 is configured to determine different combinations of bit values for the one or more bits (e.g., bits bx, by, and bz). For example, FIG. 3D shows a table 310 with original values of bits bx, by, and bz, and FIG. 3E shows a table 312 with all other possible combinations of bits bx, by, and bz for data packet 304 and another table 314 with all other possible combinations of bits bx, by, and bz for data packet 308. In some embodiments, the controller 104 may be configured to remove/ignore the original values of the one or more bits (e.g., bits bx, by, and bz) since those combinations are already determined to be erroneous. The controller 104 is configured to perform the decryption operation on the data packet (e.g., data packet 308) with the different combinations of bit values for the one or more bits (e.g., bits bx, by, and bz) to identify a correct combination of bit values for the one or more bits (e.g., bits bx, by, and bz). For example, the controller 104 may be configured to attempt to decrypt the data packet 308 again using the different combinations of bx, by, and bz values shown in FIG. 3F, table 316, to identify the correct combination of bit values for bits bx, by, and bz. If the controller 104 successfully decrypts the data packet with one of the combinations of bit values for the one or more bits (e.g., bits bx, by, and bz), then that combination can be identified as the correct combination of bit values for the one or more bits (e.g., bits bx, by, and bz) affected by the one or more bit errors.

When the correct combination of bit values for the one or more bits (e.g., bits bx, by, and bz) is identified at step 212, the data packet is recovered (e.g., corrected so that it can be decrypted and consumed) based on the correct combination of bit values for the one or more bits (e.g., bits bx, by, and bz). For example, the controller 104 is configured to recover the data packet based on the correct combination of bit values for the one or more bits.

At step 214, the corrected data packet (e.g., corrected data packet 308) is decrypted and consumed (e.g., accepted/read by the controller 104), and duplicates (e.g., data packet 304) of the data packet may be removed (e.g., deleted) from the recovery buffer. In embodiments, after successfully decrypting the data packet (based on the correct combination of bit values), the controller 104 is configured to consume the corrected data packet (e.g., corrected data packet 308) and remove duplicates (e.g., data packet 304) of the data packet from the recovery buffer.

In embodiments, the controller 104 may be configured to store a (corrupt) data packet in the recovery buffer (step 216) when no duplicates of the data packet are identified at step 208 or when the controller 104 fails to recover the data packet at step 212. For example, the controller 104 may be unable to recover the data packet if the data packet and its duplicate have bit errors at the same bit locations. In such a case, the controller 104 may store the data packet in the recovery buffer so that it can be utilized for recovery when another duplicate is received at the communication node 102.

In some embodiments, data packets (e.g., data packets 302, 304, 306, etc.) may be tagged with time stamps (e.g., t3, t2, t1) when the data packets are stored in the recovery buffer (e.g., recovery buffer 300). A data packet is then removed from the recovery buffer after a predetermined amount of time has lapsed from the time stamp (step 218). For example, the controller 104 can be configured to tag a data packet with a time stamp and remove the data packet from the recovery buffer after a predetermined amount of time has lapsed from the time stamp.

In some embodiments, the recovery buffer (e.g., recovery buffer 300) is configured to store up to a predetermined maximum number of data packets. For example, the recovery buffer may comprise a stack with limited depth. In such embodiments, an oldest data packet may be removed from the recovery buffer upon receipt of a new data packet when the recovery buffer is full. For example, the controller 104 may be configured to remove the oldest data packet from the recovery buffer to store a newer data packet when the recovery buffer is full.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A communication node for performing error recovery of encrypted data frames, comprising:
   a communication interface;
   a controller communicatively coupled to the communication interface, the controller configured to:
   receive a data packet via the communication interface;
   perform a decryption operation on the data packet;
   compare the data packet with one or more data packets stored in a recovery buffer to identify a duplicate of the data packet when the decryption operation fails;
   identify one or more bits affected by one or more bit errors based on a comparison between the data packet and the duplicate of the data packet;
   determine different combinations of bit values for the one or more bits;
   perform the decryption operation on the data packet with the different combinations of bit values for the one or more bits to identify a correct combination of bit values for the one or more bits; and
   recover the data packet based on the correct combination of bit values for the one or more bits.

2. The communication node of claim 1, wherein the controller is further configured to:
   remove the duplicate of the data packet from the recovery buffer after recovering the data packet.

3. The communication node of claim 1, wherein the controller is further configured to:
   tag the data packet with a time stamp and store the data packet in the recovery buffer when there are no duplicates of the data packet in the recovery buffer.

4. The communication node of claim 3, wherein the controller is further configured to:
   remove the data packet from the recovery buffer after a predetermined amount of time has lapsed from the time stamp.

5. The communication node of claim 1, wherein the controller is further configured to:
   remove an oldest data packet from the recovery buffer upon receipt of a new data packet when the recovery buffer is full, wherein the recovery buffer is configured to store up to a predetermined maximum number of data packets.

6. The communication node of claim 1, wherein the controller is configured to identify the duplicate of the data packet when the data packet and the duplicate of the data packet have less than a predetermined maximum number of mismatched bit values.

7. The communication node of claim 1, wherein the controller is configured to receive the data packet from another communication node within a multi-node system.

8. A multi-node system for performing error recovery of encrypted data frames, comprising:
   a plurality of communication nodes configured to receive data packets broadcasted from other communication nodes within the multi-node system, wherein a communication node of the plurality of communication nodes includes:
   a communication interface;
   a controller communicatively coupled to the communication interface, the controller configured to:
   receive a data packet from another communication node via the communication interface;
   perform a decryption operation on the data packet;

compare the data packet with one or more data packets stored in a recovery buffer to identify a duplicate of the data packet when the decryption operation fails;

identify one or more bits affected by one or more bit errors based on a comparison between the data packet and the duplicate of the data packet;

determine different combinations of bit values for the one or more bits;

perform the decryption operation on the data packet with the different combinations of bit values for the one or more bits to identify a correct combination of bit values for the one or more bits; and recover the data packet based on the correct combination of bit values for the one or more bits.

9. The multi-node system of claim 8, wherein the controller is further configured to:

remove the duplicate of the data packet from the recovery buffer after recovering the data packet.

10. The multi-node system of claim 8, wherein the controller is further configured to:

tag the data packet with a time stamp and store the data packet in the recovery buffer when there are no duplicates of the data packet in the recovery buffer.

11. The multi-node system of claim 10, wherein the controller is further configured to:

remove the data packet from the recovery buffer after a predetermined amount of time has lapsed from the time stamp.

12. The multi-node system of claim 8, wherein the controller is further configured to:

remove an oldest data packet from the recovery buffer upon receipt of a new data packet when the recovery buffer is full, wherein the recovery buffer is configured to store up to a predetermined maximum number of data packets.

13. The multi-node system of claim 8, wherein the controller is configured to identify the duplicate of the data packet when the data packet and the duplicate of the data packet have less than a predetermined maximum number of mismatched bit values.

14. The multi-node system of claim 8, wherein the multi-node system is a mobile ad hoc network (MANET), and the communication node is a mobile communication node.

15. A method of performing error recovery of encrypted data frames, comprising:

receiving a data packet at a communication node within a multi-node system;

performing a decryption operation on the data packet;

comparing the data packet with one or more data packets stored in a recovery buffer to identify a duplicate of the data packet when the decryption operation fails;

identifying one or more bits affected by one or more bit errors based on a comparison between the data packet and the duplicate of the data packet;

determining different combinations of bit values for the one or more bits;

performing the decryption operation on the data packet with the different combinations of bit values for the one or more bits to identify a correct combination of bit values for the one or more bits; and recovering the data packet based on the correct combination of bit values for the one or more bits.

16. The method of claim 15, further comprising:

removing the duplicate of the data packet from the recovery buffer after recovering the data packet.

17. The method of claim 15, further comprising:

tagging the data packet with a time stamp and storing the data packet in the recovery buffer when there are no duplicates of the data packet in the recovery buffer.

18. The method of claim 17, further comprising:

removing the data packet from the recovery buffer after a predetermined amount of time has lapsed from the time stamp.

19. The method of claim 15, further comprising:

removing an oldest data packet from the recovery buffer upon receipt of a new data packet when the recovery buffer is full, wherein the recovery buffer is configured to store up to a predetermined maximum number of data packets.

20. The method of claim 15, wherein the duplicate of the data packet is identified when the data packet and the duplicate of the data packet have less than a predetermined maximum number of mismatched bit values.

\* \* \* \* \*